US008824382B2

(12) United States Patent
Shu et al.

(10) Patent No.: US 8,824,382 B2
(45) Date of Patent: Sep. 2, 2014

(54) RESERVATION OF SPECTRUM RESOURCES IN WHITE SPACES

(75) Inventors: Kodo Shu, Kawasaki (JP); Jussi Tapani Kahtava, Fleet (GB); Pekka Ojanen, Espoo (FI)

(73) Assignee: Nokia Corporation, Espoo (FI)

( * ) Notice: Subject to any disclaimer, the term of this patent is extended or adjusted under 35 U.S.C. 154(b) by 551 days.

(21) Appl. No.: 12/891,924

(22) Filed: Sep. 28, 2010

(65) Prior Publication Data

US 2011/0080882 A1 Apr. 7, 2011

Related U.S. Application Data

(60) Provisional application No. 61/248,059, filed on Oct. 2, 2009.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| 8,274,885 B2 * | 9/2012 | Wu et al. ........................ 370/230 |
| 2009/0196180 A1 * | 8/2009 | Bahl et al. ...................... 370/235 |
| 2010/0124254 A1 * | 5/2010 | Wu et al. ........................ 375/131 |
| 2010/0255794 A1 * | 10/2010 | Agnew ............................. 455/77 |

OTHER PUBLICATIONS

Buljore, Soodesh et al., "IEEE P1900.4 Standard: Reconfiguration of Multi-Radio Systems," IEEE Region 8 Sibircon 2008, 2008, pp. 413-417.
Ingersoll, Minnie, "White Spaces Database," IEEE 802.19-09/0047r0, Jul. 16, 2009, pp. 1-23.
"FCC 08-260, Second Report and Order and Memorandum Opinion and Order," pp. 1-130, Nov. 2008, Federal Communications Commission.
Siep, Tom, "IEEE P802.19, Wireless Coextistence," Mar. 15, 2006, pp. 1-4, IEEE P802.19-06/0016r0.

* cited by examiner

*Primary Examiner* — Minh-Trang Nguyen
(74) *Attorney, Agent, or Firm* — Banner & Witcoff, Ltd.

(57) ABSTRACT

A white space entity reserves spectrum in white space from a reservation system. Consequently, the white space entity may utilize television bands that are unused at a specified time period and geo-location in order to support different services such as wireless audio transmission, networking, video surveillance, and video conferencing. The white space entity requests reservation of spectrum resources from the reservation system by sending a reservation request. The request includes request parameters that may include geo-location, model number or manufacture code number, priority of entity, reservation time period, and maximum power level. The reservation system consequently verifies the request from the priority of the white space entity and the availability of white space spectrum for the desired time period. The white space entity then extracts confirmation parameters from a reservation confirmation message and subsequently transmits on white spectrum in accordance with the parameters.

21 Claims, 7 Drawing Sheets

RESERVATION OF SPECTRUM RESOURCES IN WHITE SPACES

CROSS-REFERENCE TO RELATED APPLICATIONS

This application claims priority to U.S. provisional patent application Ser. No. 61/248,059, filed Oct. 2, 2009, entitled "Reservation of Spectrum Resources in White Spaces," hereby incorporated herein by reference as to its entirety.

BACKGROUND

In telecommunications, white spaces refer to frequencies allocated to broadcasting services but not used locally. National and international bodies assign bands for specific uses, and in most cases, license the rights to the spectrum. This frequency allocation process creates a band plan, in which guard bands may be assigned between used radio bands or channels to avoid interference. In addition, there may be unused portions of radio spectrum that have either never been used or are becoming available as a result of technical changes. In particular, the switchover to digital television has freed up frequency spectrum between 50 MHz and 700 MHz because digital transmissions can be packed into adjacent channels while analog transmissions cannot. Consequently, the band can be compressed into fewer channels, while still allowing for more transmissions. This spectrum made available by the conversion to digital television is sometimes called "digital dividend."

In the United States, the Federal Communications Commission (FCC) ruled that unlicensed devices guaranteeing that they will not interfere with assigned broadcasts can use the empty white spaces in the frequency spectrum. The abandoned television frequencies (digital dividend) are primarily in the upper UHF 700-megahertz band, covering TV channels 52 to 69 (698 to 806 MHz). Spectrum for television transmission and its white spaces continue to exist below the digital dividend in the UHF band as well as in the VHF band for which mobile users and white-space devices require larger antennas.

A device intended to use these available channels is often referred as a white space device (WSD). A white space device may be designed to detect the presence of existing signals from TV stations and other wireless users to avoid inadvertent use of these channels. Some approaches propose including geo-location capabilities and access to a database indicating channels not used by all TV stations in an area.

Various proposals, including IEEE 802.22 and those from the White Spaces Coalition, have advocated using white spaces left by the termination of analog TV to provide wireless broadband Internet access. However, these efforts may impact wireless microphones, medical telemetry, and other technologies that have historically relied on these open frequencies.

The White Spaces Coalition includes a number of large technology companies that plan to deliver high speed broadband internet access to consumers in the United States via existing white space in unused television frequencies between 54-698 MHz (TV Channels 2-51). One of the goals is to provide data rates of at least 80 Mbps for white space short-range networking.

SUMMARY

This Summary is provided to introduce a selection of concepts in a simplified form that are further described below in the Detailed Description. This Summary is not intended to identify key features or essential features of the invention.

A white space entity, e.g., a white space device or access point, may reserve spectrum in white space from a reservation system. Consequently, the white space entity may access television bands that are unused at a specified time period and place. White space entities may support different services, including wireless audio transmission, mesh and ad-hoc networking, video surveillance, video conferencing, and personal consumer applications.

The white space entity may request reservation of spectrum resources from a reservation system by sending a reservation request over an Internet Protocol (IP) connection. The reservation request includes request parameters that may include geo-location, model number or manufacture code number, priority of entity, reservation time period, and maximum power level. The reservation system consequently verifies the request from the priority of the white space entity and the availability of white space spectrum for the desired time period and desired geo-location.

The white space entity may extract confirmation parameters from a reservation confirmation message that is responsive to the reservation request. The white space entity may subsequently transmit on the reserved channels during the reserved time period.

BRIEF DESCRIPTION OF THE DRAWINGS

A more complete understanding of the exemplary embodiments the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Aspects of various embodiments relate to reserving spectrum resources by a white space entity. A white space entity may be (or include) a white space device such as a portable device capable of Mode II operation as defined in an FCC rule codified at title 47 of the Code of Federal Regulations, section 15.703(i) (47 CFR 15.703(i)) and/or as described in other FCC rules and orders. A white space device may also be (or include) an access point (AP). According to aspects of various embodiments, a white space device may access television bands that are unused at a specific time and place. This part of TV spectrum is often referred as white space (WS). White space devices may support different services, including mesh and ad-hoc networking, video surveillance, video conferencing, and personal consumer applications.

Figure 1:
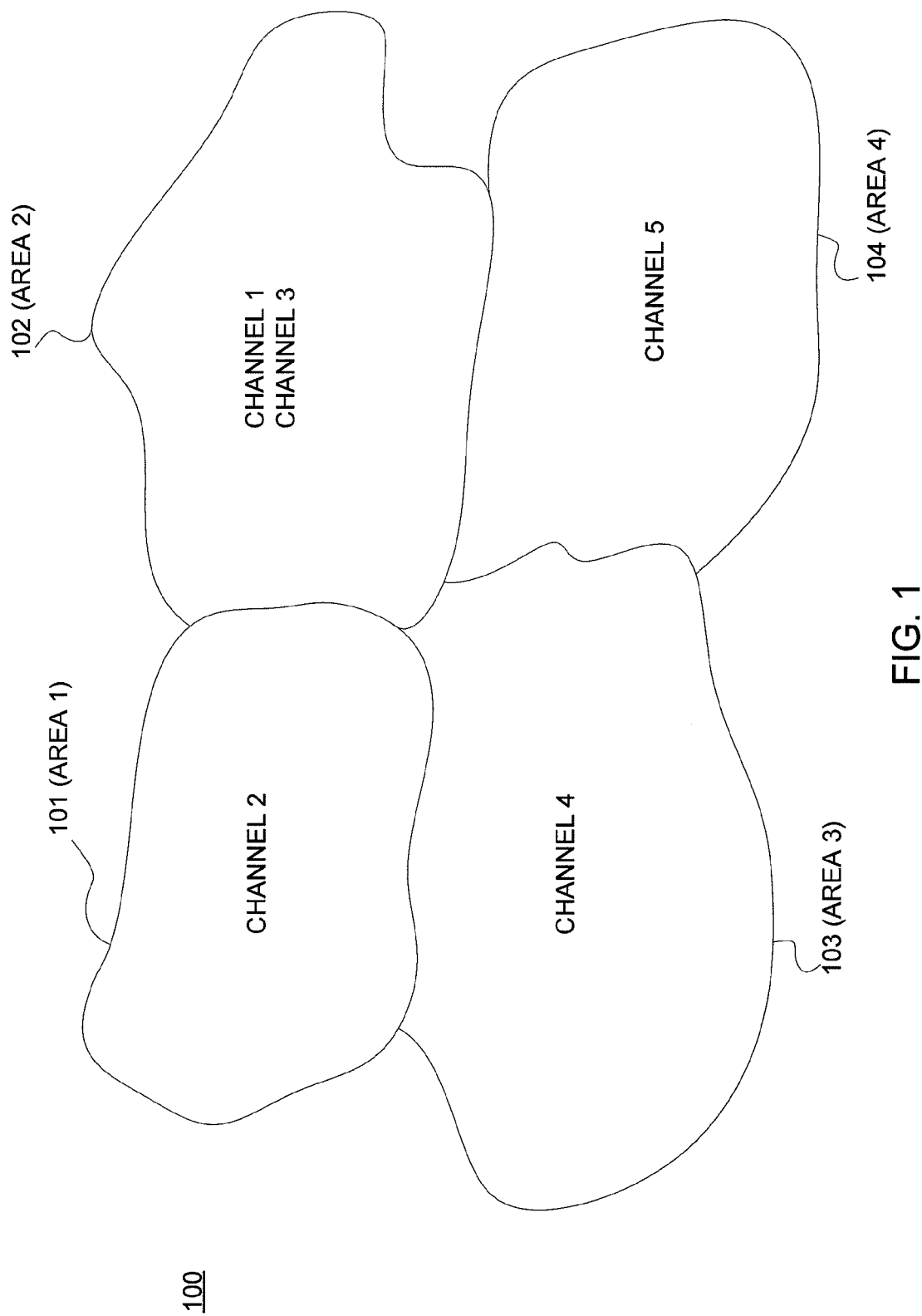
FIG. 1 shows available white space in frequency spectrum for different geographical areas in accordance with an exemplary embodiment of the invention.

FIG. 1 shows available white space in frequency spectrum for different geographical areas in accordance with an exemplary embodiment of the invention. Region 100 is partitioned into different geographical areas (e.g., areas 101, 102, 103, and 104), where each area has a set of channels available. For some primary services such as broadcast TV, abutting areas are typically allocated different channels to reduce interference. This leads to different channels being available to white space devices in neighboring areas. For example, channel 2, channels 1 and 3, channel 4, and channel 5 are allocated to areas 101, 102, 103, and 104, respectively. A white space entity may request a channel or some channels if they are not being used by a primary service or a protected entity.

According to FCC 08-260, *Second Report and Order and Memorandum Opinion and Order* (November 2008), a white space device may support geo-location, access to a database that contains the latest spectrum availability information for certain places, and sensing of signals in the white space frequency spectrum. A white space device may maintain the latest information of the database and transmit at proper frequency bands according to the latest spectrum availability information. If a white space device does not have the most current spectrum availability information or if the white space device does not accurately sense signals generated by other sources in the white space spectrum, the white space device may interfere with primary services and protected entities.

Figure 2:
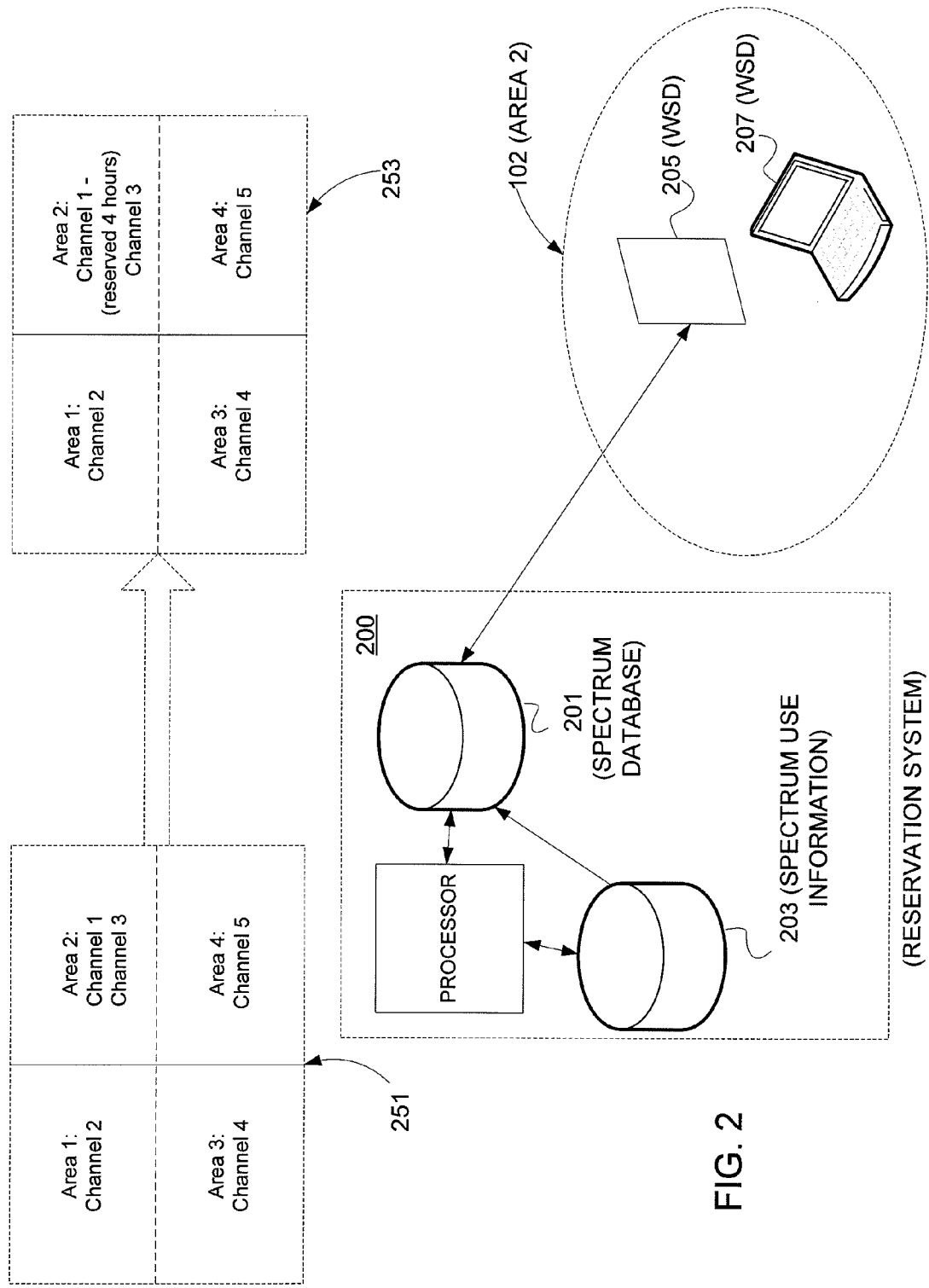
FIG. 2 shows an exemplary scenario in which a white space device (WSD) reserves white space resources.
Figure 3:
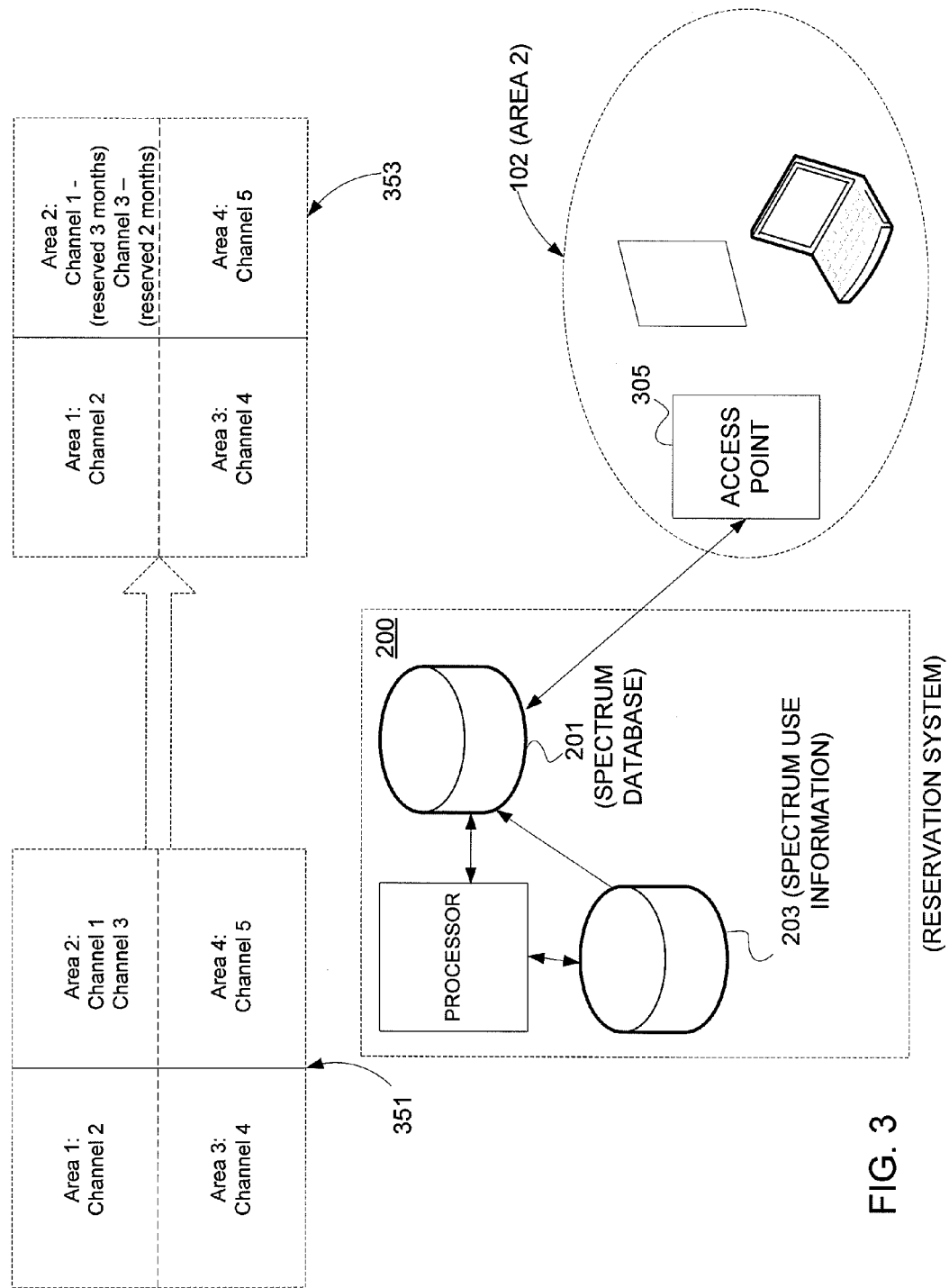
FIG. 3 shows an exemplary scenario in which an access point reserves white space resources.

FIG. 2 shows a scenario in which a white space device (WSD) 205 reserves white space resources in accordance with an exemplary embodiment of the invention. Reservation system 200 provides a resource-reservation mechanism for white space devices 205 and 207 (as shown in FIG. 2) as well as access point 305 (as shown in FIG. 3). Reservation system 200 reserves white space spectrum resources in spectrum database 201 as will be further discussed.

Determining the availability of white space spectrum may not always be predicated on coexistence mechanisms between radio technologies. One device attempting to utilize white space spectrum in a particular region may not correctly detect the presence of another device in the same region that is already using the relevant white space spectrum. For example, the spectrum-sensing components a device attempting to utilize white space spectrum may be malfunctioning. Consequently, at least some embodiments provide a mechanism to reserve a dedicated portion of spectrum in space-time-frequency domain. Moreover, the reservation of resources may be on a short term basis rather than depending on a registration process for protected entities by a regulator.

The described approach provides for flexible and efficient utilization of the white space spectrum. With some embodiments, a white space entity (e.g., white space devices 205 and 207 and access point 305) may be registered with a registrar for WS entities, and an "authorized party" (e.g., a third party, or parties, selected through a public notice process to solicit interested parties as discussed in FCC 08-260, *Second Report and Order and Memorandum Opinion and Order*) may determine whether the white space entity is allowed to become an entity with a right to reserve spectrum resources. A priority may be associated with the white space entity when different entities with a right to reserve spectrum resources make requests overlapping in spectrum, time and geographical location. For example, contents 251 in database 201 indicate that channel 2 is available in area 101, channels 1 and 3 in area 102, channel 4 in area 103, and channel 5 in area 104. After white space device 205 reserves white spectrum resources, contents 253 in database 201 is updated to indicate that channel 1 is reserved for a specified time period (4 hours) in area 102. Other types of resources may be reserved including a requested power level so that a white space device can transmit at a higher power level than other white space devices. White space devices may be allowed to transmit only on spectrum that is identified as available by reservation system 200. If the reserved spectrum is indicated as being available by the reservation system 200 at the end of the reserved time period, the white space device may continue transmitting on it.

A white space device (e.g., device 207) may determine its current geographical location from latitude, longitude, and optionally altitude information provided by a Global Positioning System (GPS) receiver (not explicitly shown in FIG. 2). Device 207 may then map the latitude and longitude information to geographical area (e.g., areas 101, 102, 103, or 104 as shown in FIG. 1). The mapping may use stored data that represents latitude/longitude values associated with different geographical areas.

A reservation of resources may be requested by sending a reservation message from white space device 205 or access point 305 (as shown in FIG. 3) to reservation system 200. The reservation-request messages typically contain request parameters to specify the requested reservation. Depending on whether the requesting white space entity is a white space device or an access point, the reservation message content may contain different request parameters. For example, with a white space device, the reservation request may contain its device id, the geo-location of the WSD, type of WSD (e.g., model number or manufacture code number), priority, reservation period, requested geo-locations, and requested power levels for reservation. With an access point, the reservation request may contain its id, the geo-location of the access point, type of AP (e.g., model number or manufacture code number), priority of access point, operator code, reservation period, requested geo-locations, and requested power levels for reservation. An operator code typically identifies the operating company of the wireless access points. The same operator code may already be registered when the operator of the access points registers as an entity that wants to reserve spectrum resources.

Reservation system 200 checks database 201 to confirm whether the reservation is feasible. Reservation system 200 may check if the reservation request fulfills regulatory rules and if there may be potential interference to other incumbent services (e.g., TV broadcasting) that have higher priorities than the requesting white space entity based on information contained in spectrum use database 203. In addition, reservation system 200 may also determine which channel to allocate and other limitations (e.g., allowed power levels for the associated geographical areas).

Subsequently, reservation system 200 sends a confirmation message to white space device 205 or access point 305. The confirmation message may contain confirmation parameters that include the reserved channel, confirmed reservation period, and allowed geo-locations. Database 201 is updated with available channels and reserved channels with associated reservation time periods and geo-locations.

Referring to the scenario shown in FIG. 2, reservation system 200 and WSD 205 may perform the following steps in order to reserve white space spectrum resources.
1. WSD 205 may initiate the connection with reservation system 200. The connection may be an Internet Protocol (IP) connection over wireline facilities, over legacy wireless spectrum, or over available WS spectrum. In at least some embodiments, initiating a connection can include initiating communications using a communication mode that might be considered "connectionless" in one or more respects (e.g., communications that utilize User Datagram Protocol (UDP) or short message service (SMS)).
2. WSD 205 may send the spectrum-reservation message to reservation system 200. In the message, request parameters may include geo-location, type of WSD 205 (model number or manufacture code number), identity of the WSD 205, priority of WSD 205, and reservation time period. With some embodiments, there may be a different priority for the rights of an operator of multiple access points relative to a single WSD. For example, if a single WSD (setting up an ad hoc network) wants to reserve spectrum in a certain area, the WSD may be overruled because an AP operator is also requesting spectrum in the same area. With some embodiments, request parameters may also include the maximum power level and/or the geo-locations where WSD 205 wants to reserve spectrum resources (if the geo-location where WSD 205 sends the request is different from where it wants to reserve WS spectrum).
3. Reservation system 200 may verify the spectrum-reservation message by:
   Checking geo-location, type, identity, and priority of WSD 205 to determine if WSD 205 has the proper priority to reserve spectrum resources. For example, as previously mentioned, reservation system 200 may support a number of priority levels in its operation. (Reservation system 200 may perform the checking by accessing database 201 and/or other databases (not explicitly shown) with information about WSD identities, permissions, and the like.) If there are requests for spectrum overlapping in geo-location and time, a higher priority request may be given precedence over a lower priority one. The priority level may be set during the initial registration of the entity to the registrar.
   Confirming whether the request is feasible, i.e., no violation of regulatory rules or other rules and no harmful interference to other incumbent services (e.g., TV broadcasting) that have higher priorities based on information obtained from database 203. This confirmation process (especially interference analysis) may be similar to link-budget calculations in a cellular telephone or other wireless communication system and be based on known data that includes geo-locations and transmission powers of WSD 205 and other WSDs in the relevant geographic regions.
   Determining which channel is to be allocated and the corresponding time period.
4. Reservation system 200 may update relevant data (e.g., in DB 201), including available channels for all areas, reserved channels, and reserved time period for the requested geo-locations or area.
5. Reservation system 200 may send the confirmation message to WSD 205. The confirmation message contains confirmation parameters that may include information of the reserved channels, confirmed reservation period, allowed power level, and allowed geo-locations. Moreover, the allowed power level may vary based on the associated geo-locations.
6. WSD 205 may transmit at the reserved channel in accordance with the confirmation parameters. WSD 205 may transmit below the allowed power level during the reserved time period.

FIG. 3 shows a scenario in which access point 305 reserves white space resources from reservation system 200 in accordance with an exemplary embodiment of the invention. Contents 351 in database 201 indicate that channel 2 is available in area 101, channels 1 and 3 in area 102, channel 4 in area 103, and channel 5 in area 104. After access point 305 reserves white spectrum resources, contents 353 in database is updated to indicate that channel 1 and channel 3 are reserved for specified time periods (3 months and 2 months, respectively) in area 102. Typically, the reserved time period and the number of reserved channels are greater for an access point than for a white space device.

The scenario shown in FIG. 3 exemplifies a situation in which a white space operator wants to reserve spectrum resources for access point 305. Reservation system 200 and AP 305 may perform the following steps in order to reserve white space spectrum resources.
1. AP 305 may initiate the connection with reservation system 200. The connection may be an IP connection over wireline facilities, over legacy wireless spectrum, or over available WS spectrum.
2. AP 305 may send the spectrum-reservation message to reservation system 200. In the message, request parameters may include geo-location, type (model number or manufacture code number), identity of AP 305, priority of AP 305, reservation period, and operator code. With some embodiments, parameters may also include the maximum power level and/or the geo-locations where AP 305 wants to reserve spectrum resources.
3. Reservation system 200 may verify the spectrum-reservation message by:
   Checking geo-location, type, priority and identity of AP 305, and operator code to determine if AP 305 has the right priority to reserve spectrum resources.
   Confirming whether the request is feasible, i.e., no violation of regulatory rules or other rules and no harmful interference to other incumbent services (e.g., TV broadcasting) that have higher priorities based on information obtained from database 203. This confirmation process (especially interference analysis) may be similar to link-budget calculations by knowing geo-locations and transmission power of AP 305.
   Determining which channel shall be allocated and the corresponding time period.
4. Database 201 may be updated to include reserved channels and reserved time periods for the requested geo-locations or area.
5. Database 201 may send the confirmation message to AP 305. The confirmation message contains confirmation parameters that may include information of the reserved channels, confirmed reservation period, allowed power level, and allowed geo-locations. Moreover, the allowed power level may vary based on the associated geo-locations.
6. AP 305 may transmit at the reserved channel in accordance with the confirmation parameters. AP 305 may transmit below the allowed power level during the reserved time period.

Figure 4:
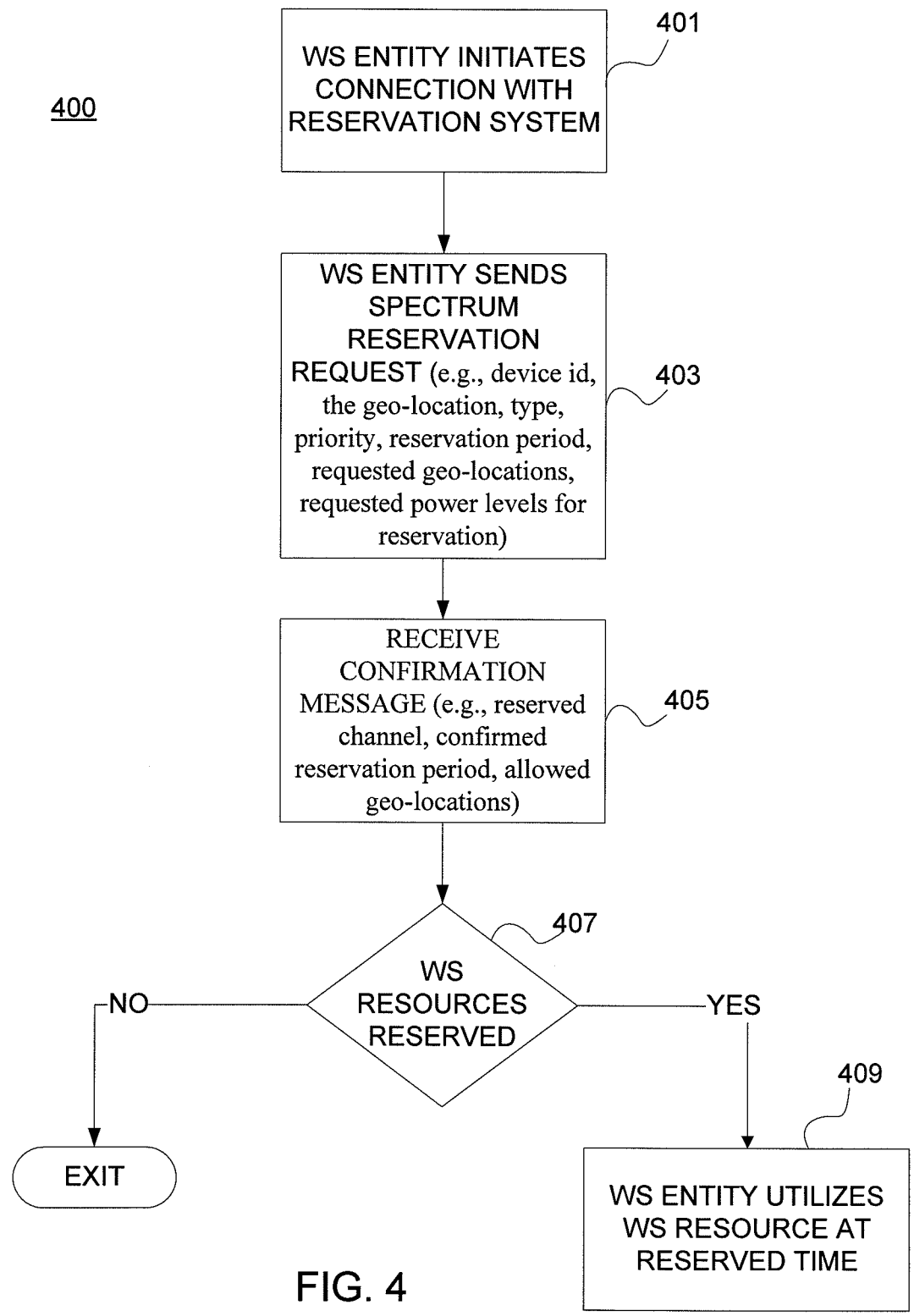
FIG. 4 shows a flow diagram for a white space entity reserving white space resources in accordance with an exemplary embodiment of the invention.

FIG. 4 shows a flow diagram 400 for a white space entity reserving white space resources in accordance with an exemplary embodiment of the invention. In step 401, a white space entity (e.g., WSD 205 or AP 305) may initiate a connection with reservation system 200. For example, the connection may utilize an IP protocol using wireline facilities, legacy wireless facilities, or WS facilities. In step 403, the white space entity may then send a reservation request that includes the geo-location, model number or manufacture code number, identity, priority, reservation period, and operator code (if the WS entity is an access point).

The WS entity may consequently receive a reservation confirmation in step 405. The WS entity parses the confirmation message to determine whether resources can be reserved in accordance to the request parameters. If step 407 results in a determination that resources cannot be reserved, process 400 is exited. For example, the WS entity may not have a proper priority or resources have already been reserved by other WS entities. However, the WS entity may request spectrum resources in other geo-locations or at other times. The WS entity may transmit in accordance with confirmation parameters in step 409 if resources are available. With some embodiments, exiting process 400 may not prevent the WSD from operating, only that it cannot operate on a dedicated spectrum. The WSD may still query what spectrum is available and operate on it as any WSD.

Figure 5:
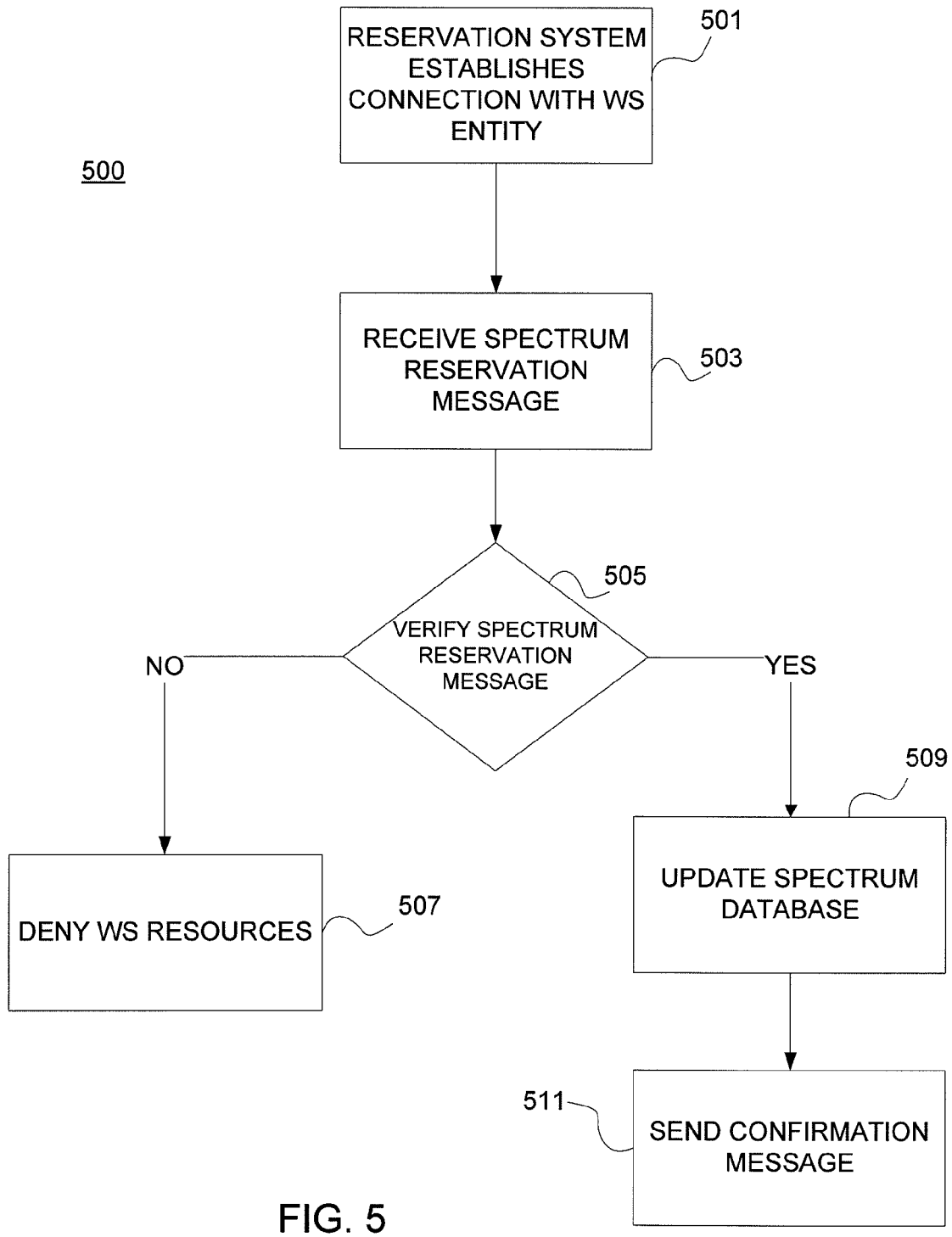
FIG. 5 shows a flow diagram for a reservation system reserving white space resources for a white space entity in accordance with an exemplary embodiment of the invention.

FIG. 5 shows a flow diagram 500 (corresponding to flow diagram 400) for reservation system 200 reserving white space resources for white space entity in accordance with an exemplary embodiment of the invention. In step 501 (corresponding to step 401 as shown in FIG. 4), reservation system 200 may establish a connection with a WS entity. Subsequently, in step 503 (corresponding to step 403) reservation system 200 may receive a reservation request from the WS entity.

In step 505, reservation system 200 may verify the reservation request. For example, reservation system 200 may verify that the WS entity has a proper priority and verify that the reservation request is feasible by determining that harmful interference to incumbent service will not occur. If not, reservation system 200 determines whether channels are available for the desired time period. If resources can be reserved, reservation system 200 updates database 201 and sends a confirmation message in steps 509 and 511. Otherwise, reservation system 200 may send a confirmation message denying resources in step 507.

Figure 6:
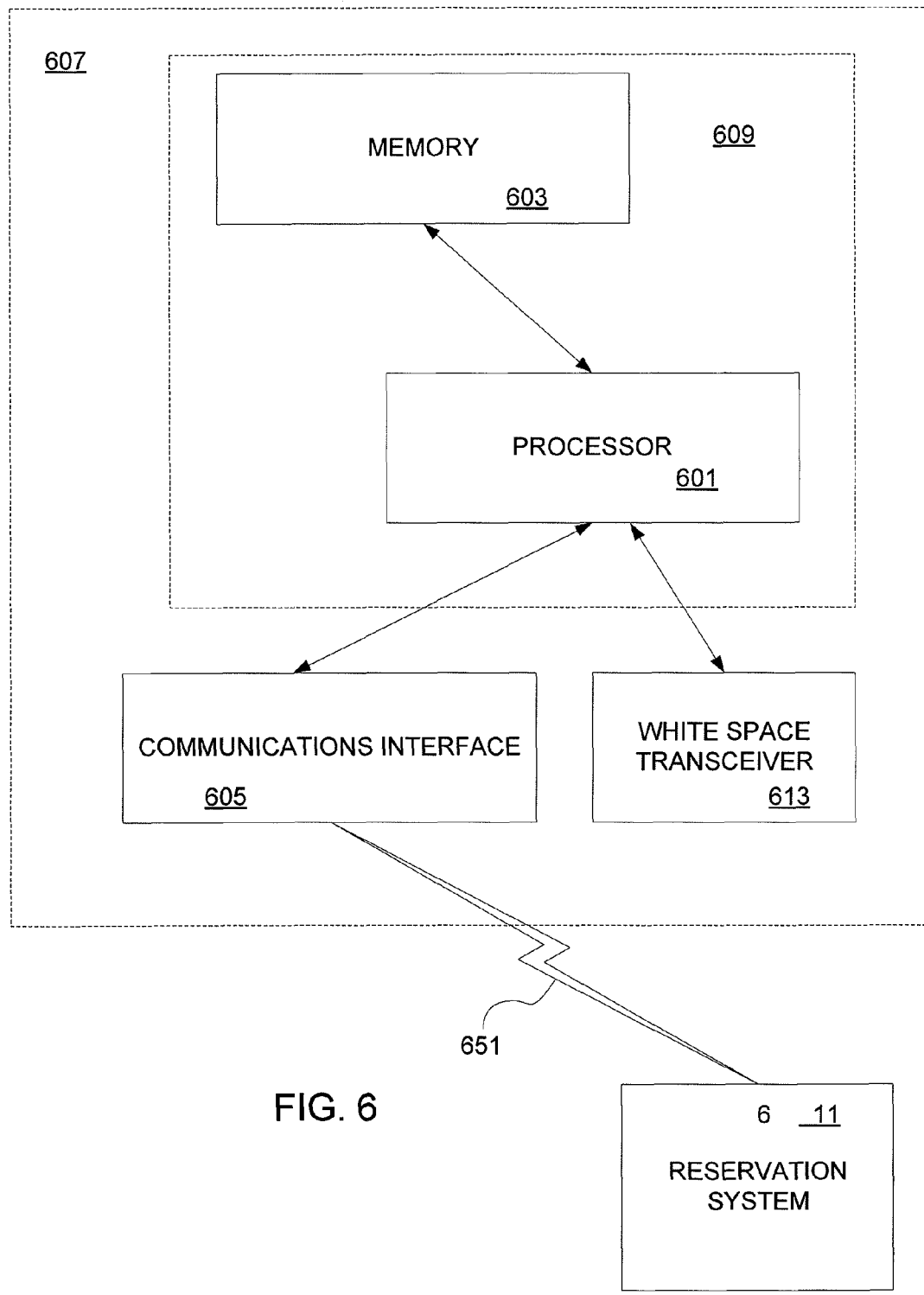
FIG. 6 shows an apparatus supporting a white space entity in accordance with an exemplary embodiment of the invention.

FIG. 6 shows an apparatus 607 supporting a white space entity in accordance with an exemplary embodiment of the invention. Apparatus 607 can be, e.g., one of WSD 205, WSD 207 or AP 305 described above. Apparatus 607 interacts with reservation system 611 through communications channel 651 in one of the manners previously discussed in FIG. 4 at block 401 and in FIG. 5 at block 501. Communications channel 651 may be, e.g., an IP connection over wireline facilities, legacy wireless spectrum, or white space spectrum. Consequently, communications interface 605 may support a type of communications channel other than a WS channel when reserving WS spectrum resources from reservation system 611.

Processor 601 initiates a request for a WS spectrum resource through communications interface 605 (e.g., a wireless transceiver) over channel 651 by executing reservation process 400 as previously discussed. Processor 601 may execute computer executable instructions from a computer-readable medium, e.g., memory 603, in order perform a discovery process (any or all of the processes described herein). With some embodiments, an apparatus 609 may comprise processor 601 and memory 603. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 601. The executable instructions may carry out any or all of the method steps described herein.

Apparatus 607 may be implemented as one or more ASICs or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

With some embodiments, apparatus 607 may use separate communication facilities for resource reservation and for supporting services over white space. For example, communications interface 605 may utilize legacy wireless spectrum when reserving resources through reservation system 611 while white space transceiver 613 may utilize reserved white space spectrum when providing services.

With some embodiments, processor 601 may correspond to one or more processors and memory 603 may correspond to one or more memories.

Figure 7:
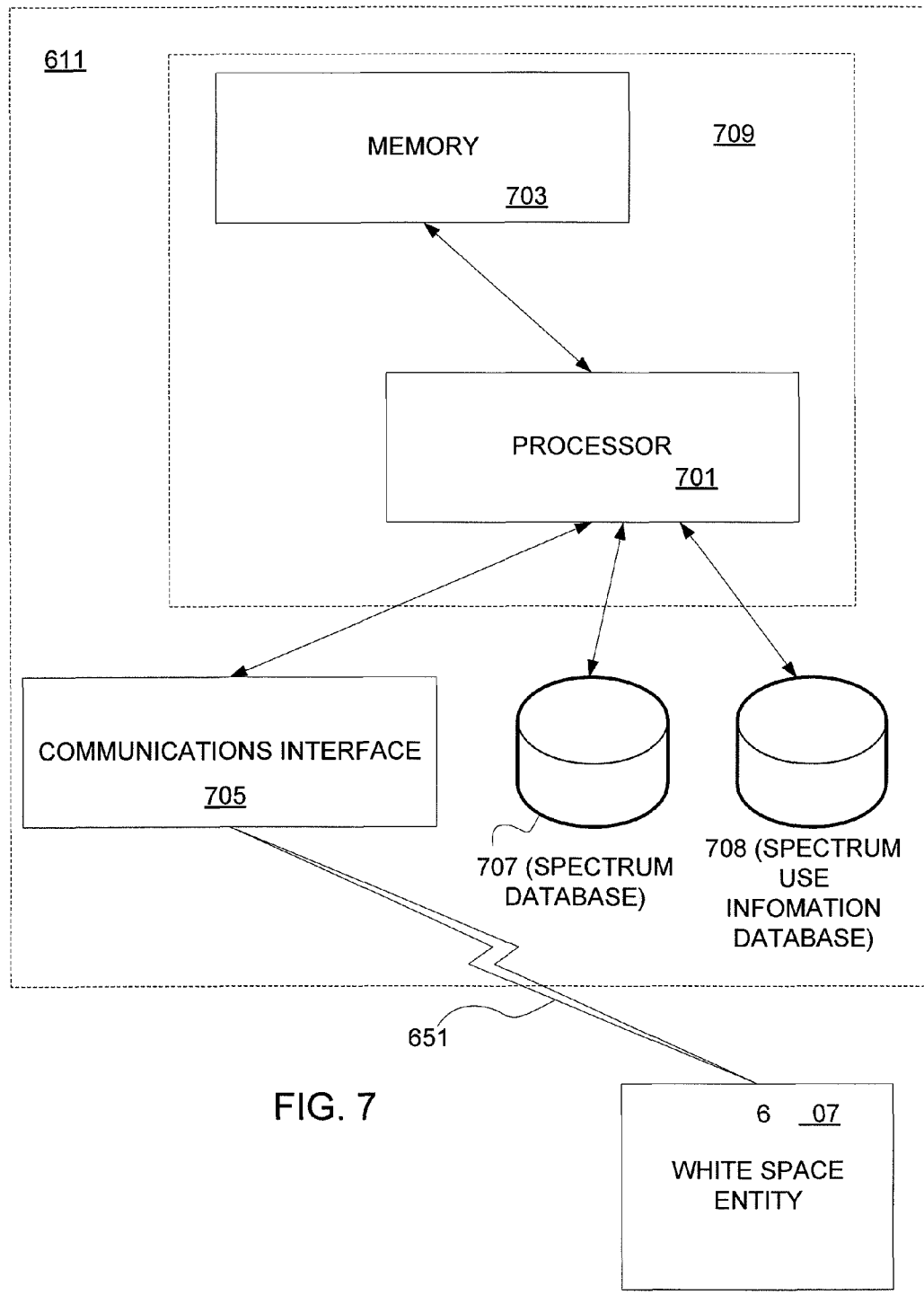
FIG. 7 shows an apparatus supporting a reservation system in accordance with an exemplary embodiment of the invention.

FIG. 7 shows apparatus 611 supporting a reservation system in accordance with an exemplary embodiment of the invention. Apparatus 611 can be, e.g., reservation system 200 described above. Communications interface 705 (e.g., a wireless transceiver or a network connection to a wireless transceiver) may support different types of communications channels in order to support reservation of white space spectrum by different white space entities. Processor 701 responds to a request for WS spectrum resource through communications interface 705 over channel 651 by executing reservation process 500 as previously discussed. Processor 701 may execute computer executable instructions from a computer-readable medium, e.g., memory 703, in a similar manner as previously discussed.

With some embodiments, processor 701 may correspond to one or more processors and memory 703 may correspond to one or more memories.

With some embodiments, apparatus 607 or apparatus 611 may include one or more integrated circuits (that may be grouped into a chip set) to perform some or all of the described functionalities.

The following are exemplary embodiments.

A method (e.g., with an apparatus for a wireless entity (white space entity) that includes a white space device or an access point) may comprise in combination one or more of the followings aspects. A white space entity may establish a connection with reservation system that may utilize an IP connection over a wireline, legacy wireless, or WS channel. The white space entity may then request white space spectrum resources from the reservation system based on request parameters that may include geo-location, model number or manufacture code number, identity of entity, priority of entity, reservation time period, and maximum power level. Subsequently, the white space entity receives a reservation confirmation from reservation system and extracts confirmation parameters that may include reserved channels, reserved time period, allowed power level, and allowed geo-locations and may further include allowed power levels for specified geo-locations. The white space entity then may transmit on the reserved channel during the reserved time period.

An apparatus for a wireless entity (white space entity) may include a white space device or an access point and may comprise in combination one or more of the followings aspects. The apparatus may include a processor (and optionally a memory and communications interface) configured to cause the apparatus to perform the following. The apparatus establishes a connection with reservation system that may utilize an IP connection over a wireline, legacy wireless, or WS channel. The apparatus may then request white space spectrum resources from the reservation system based on request parameters that may include geo-location, model number or manufacture code number, identity of entity, priority of entity, reservation time period, and maximum power level. Consequently, the apparatus receives a reservation confirmation from reservation system and extracts confirmation parameters that may include reserved channels, reserved time period, allowed power level, and allowed geo-locations and may further include allowed power levels for specified geo-locations. The apparatus then may transmit on the reserved channel during the reserved time period.

An apparatus for a wireless entity (white space entity) may include a white space device or an access point and may comprise in combination one or more of the followings aspects. The apparatus may include means for establishing a connection with reservation system that may include means for utilizing an IP connection over a wireline, legacy wireless, or WS channel. The apparatus may include means for requesting white space spectrum resources from the reservation system based on request parameters that may include geo-location, model number or manufacture code number, identity of entity, priority of entity, reservation time period, and maximum power level. The apparatus may include means for receiving a reservation confirmation from reservation system and for extracting confirmation parameters that may include reserved channels, reserved time period, allowed power level, and allowed geo-locations and may further include allowed power levels for specified geo-locations. The apparatus may also include means for transmitting on the reserved channel during the reserved time period.

A computer-readable medium may contain computer readable instructions that cause an apparatus (e.g., an apparatus for a wireless entity including a white space device or an access point) to perform in combination one or more of the followings aspects. The white space entity may establish a connection with reservation system that may utilize an IP connection over a wireline, legacy wireless, or WS channel. The white space entity may then request white space spectrum resources from the reservation system based on request parameters that may include geo-location, model number or manufacture code number, identity of entity, priority of entity, reservation time period, and maximum power level. Subsequently, the white space entity may receive a reservation confirmation from reservation system and extract confirmation parameters that may include reserved channels, reserved time period, allowed power level, and allowed geo-locations and may further include allowed power levels for specified geo-locations. The white space entity then may transmit on the reserved channel during the reserved time period.

A method (e.g., with an apparatus for a reservation system) may comprise in combination one or more of the followings aspects. The reservation system may establish a connection with a white space entity that may utilize an IP connection over a wireline, legacy wireless, or WS channel. The reservation system may receive a reservation request for white space spectrum resources from the white space entity with request parameters that may include geo-location, model number or manufacture code number, identity of entity, priority of entity, reservation time period, and maximum power level. The reservation system then verifies the reservation request by determining whether the priority of WS entity is proper to reserve spectrum resources based on geo-location, type and priority of WS entity, and operator code (if WS entity comprises an access point). The reservation system may further determine whether reservation request is feasible by performing an interference analysis using geo-locations and transmission power of WS entity and may determine which channels can be reserved and corresponding time period. The reservation system then updates a database with reserved channels and reserved time period for the requested geo-locations. The reservation system then sends reservation confirmation with confirmation parameters that may include reserved channels, reserved time period, allowed power level, and allowed geo-locations. The allowed power level may be based on a specific allowed geo-location.

An apparatus for a reservation system may comprise in combination one or more of the following aspects. The apparatus may include a processor (and optionally a memory and communications interface) configured to cause the apparatus to perform the following. The apparatus establishes a connection with a white space entity that may utilize an IP connection over a wireline, legacy wireless, or WS channel. The apparatus may receive a reservation request for white space spectrum resources from the white space entity with request parameters that may include geo-location, model number or manufacture code number, identity of entity, priority of entity, reservation time period, and maximum power level. The apparatus then verifies the reservation request by determining whether the priority of WS entity is proper to reserve spectrum resources based on geo-location, type and priority of WS entity, and operator code (if WS entity comprises an access point). The apparatus may further determine whether reservation request is feasible by performing an interference analysis using geo-locations and transmission power of WS entity and may determine which channels can be reserved and corresponding time period. The apparatus then updates a database with reserved channels and reserved time period for the requested geo-locations. The apparatus then sends a reservation confirmation with confirmation parameters that may include reserved channels, reserved time period, allowed power level, and allowed geo-locations. The allowed power level may be based on a specific allowed geo-location.

An apparatus for a reservation system may comprise in combination one or more of the following aspects. The apparatus may include means for establishing a connection with a white space entity that may utilize an IP connection over a wireline, legacy wireless, or WS channel. The apparatus may include means for receiving a reservation request for white space spectrum resources from the white space entity with request parameters that may include geo-location, model number or manufacture code number, identity of entity, priority of entity, reservation time period, and maximum power level. The apparatus may further include means for verifying the reservation request by determining whether the priority of WS entity is proper to reserve spectrum resources based on geo-location, type and priority of WS entity, and operator code (if WS entity comprises an access point). The apparatus further may include means for determining whether reservation request is feasible by performing an interference analysis using geo-locations and transmission power of WS entity and for determining which channels can be reserved and corresponding time period. The apparatus also may include means for updating a database with reserved channels and reserved time period for the requested geo-locations. The apparatus may also include means for sending reservation confirmation with confirmation parameters that may include reserved channels, reserved time period, allowed power level, and allowed geo-locations. The allowed power level may be based on a specific allowed geo-location.

A computer-readable medium may contain computer readable instructions that cause an apparatus (e.g., an apparatus for a reservation system) to perform in combination one or more of the followings aspects The reservation system may establish a connection with a white space entity that may utilize an IP connection over a wireline, legacy wireless, or WS channel. The reservation system may receive a reservation request for white space spectrum resources from the white space entity with request parameters that may include geo-location, model number or manufacture code number, identity of entity, priority of entity, reservation time period, and maximum power level. The reservation system may then verify the reservation request by determining whether the priority of WS entity is proper to reserve spectrum resources based on geo-location, type and priority of WS entity, and operator code (if WS entity comprises an access point). The reservation system may further determine whether reservation request is feasible by performing an interference analysis using geo-locations and transmission power of WS entity and determines which channels can be reserved and corresponding time period. The reservation system may then update a database with reserved channels and reserved time period for the requested geo-locations. The reservation system may then send reservation confirmation with confirmation parameters that may include reserved channels, reserved time period, allowed power level, and allowed geo-locations. The allowed power level may be based on a specific allowed geo-location.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
    sending a request, by a white space entity to a reservation computer system, said request seeking reservation of a white space spectrum resource during a requested time period, and said request indicating a requested geo-location;
    receiving a reservation confirmation at the white space entity, the reservation confirmation indicative of a reserved white space spectrum resource, a reserved geo-location, and a reserved time period; and
    transmitting, by the white space entity, on the reserved white space spectrum resource during the reserved time period.

2. The method of claim 1, wherein the white space entity comprises a portable device able to transmit on the reserved white space spectrum resource.

3. The method of claim 1, wherein the white space entity comprises an access point.

4. The method of claim 1, further comprising:
    establishing, by the white space entity, a communications connection with the reservation computer system.

5. The method of claim 1, wherein:
    the reserved geo-location contains at least a portion of the requested geo-location; and
    the transmitting only occurs when the white space entity is located in the reserved geo-location.

6. The method of claim 1, wherein:
    the request is indicative of a requested power level;
    the reservation confirmation is indicative of a reserved power level; and
    the transmitting includes transmitting at a transmitted power level that does not exceed the reserved power level.

7. The method of claim 1, wherein the sending and the transmitting utilize non-overlapping radio spectra.

8. The method of claim 1, further comprising:
    receiving an indication that the reserved white space spectrum resource is available after the reserved time period; and
    continuing to transmit, by the white space entity and after the reserved time period, on the reserved white space spectrum resource.

9. The method of claim 2, further comprising:
    adjusting a transmitted power level, by the portable device based on a geo-location of the portable device.

10. An apparatus comprising:
    at least one processor; and
    at least one memory having stored thereon machine executable instructions, the at least one memory and the machine executable instructions configured to, with the at least one processor, cause the apparatus to:
        send a request to a reservation computer system, said request seeking reservation of a white space spectrum resource during a requested time period, and said request indicating a requested geo-location;
        receive a reservation confirmation, the reservation confirmation indicative of a reserved white space spectrum resource, a reserved geo-location, and a reserved time period; and
        transmit on the reserved white space spectrum resource during the reserved time period.

11. The apparatus of claim 10, wherein:
    the reserved geo-location contains at least a portion of the requested geo-location; and
    the at least one memory and the machine executable instructions are configured to, with the at least one processor, cause the apparatus to:
        transmit only when the apparatus is located in the reserved geo-location.

12. The apparatus of claim 10, wherein:
    the request is indicative of a requested power level;
    the reservation confirmation is indicative of a reserved power level; and
    the at least one memory and stored instructions are further configured to, with the at least one processor, cause the apparatus to:
        transmit at a transmitted power level that does not exceed the reserved power level.

13. One or more non-transitory computer readable media storing computer readable instructions that, when executed, cause an apparatus to:
    send a request to a reservation computer system, said request seeking reservation of a white space spectrum resource during a requested time period, and said request indicating a requested geo-location;
    receive a reservation confirmation, the reservation confirmation indicative of a reserved white space spectrum resource, a reserved geo-location, and a reserved time period; and
    transmit on the reserved white space spectrum resource during the reserved time period.

14. A method comprising:
receiving a reservation request, by a reservation computer system from a white space entity, said reservation request seeking a reservation of a white space spectrum resource during a requested time period, and said reservation request indicating a requested geo-location;
verifying, by the reservation computer system, the reservation request;
updating a data structure in accordance with a reserved time period and a reserved white space spectrum resource; and
in response to the verifying, sending, by the reservation computer system, a reservation confirmation to the white space entity, the reservation confirmation indicative of the reserved white space spectrum resource, a reserved geo-location, and the reserved time period.

15. The method of claim 14, wherein the verifying comprises:
determining whether the white space spectrum resource is consistent with a priority level of the white space entity.

16. The method of claim 14, wherein the verifying comprises:
performing an interference analysis using the requested geo-location and a maximum transmitted power level of the white space entity.

17. The method of claim 14, wherein the verifying comprises:
confirming whether the request is in accordance with regulatory rules.

18. The method of claim 14, wherein the reservation confirmation is indicative of an allowed power level and an allowed geo-location of the white space entity.

19. An apparatus comprising:
at least one processor; and
at least one memory having stored thereon machine executable instructions, the at least one memory and the machine executable instructions configured to, with the at least one processor, cause the apparatus to:
receive a reservation request from a white space entity, said reservation request seeking a reservation of a white space spectrum resource during a requested time period, and said reservation request indicating a requested geo-location;
verify the reservation request;
update a data structure in accordance with a reserved time period and a reserved white space spectrum resource; and
send a reservation confirmation to the white space entity, the reservation confirmation indicative of the reserved white space spectrum resource, a reserved geo-location, and the reserved time period.

20. The apparatus of claim 19, wherein the at least one memory and the machine executable instructions are configured to, with the at least one processor, cause the apparatus to:
determine whether the requested white space spectrum resource is consistent with a priority level of the white space entity.

21. The apparatus of claim 19, wherein the at least one memory and the machine executable instructions are configured to, with the at least one processor, cause the apparatus to:
perform an interference analysis using the requested geo-location and a maximum transmitted power level of the white space entity.

* * * * *